United States Patent [19]
Main et al.

[11] 4,143,449
[45] Mar. 13, 1979

[54] WHEEL FORMING MACHINE

[75] Inventors: John A. Main, Plymouth; David Trevarrow, Horton, both of Mich.

[73] Assignee: Kelsey-Hayes Co., Romulus, Mich.

[21] Appl. No.: 833,889

[22] Filed: Sep. 16, 1977

[51] Int. Cl.² .......................................... B21D 53/26
[52] U.S. Cl. ..................................... 29/159.1; 72/334
[58] Field of Search ............... 72/334, 340; 29/159 R, 29/159.1, 406

[56] References Cited
U.S. PATENT DOCUMENTS
3,581,550 6/1971 Waterbury .......................... 29/159.1

Primary Examiner—Lowell A. Larson
Attorney, Agent, or Firm—Ernest A. Beutler

[57] ABSTRACT

A method and a machine for performing final finishing operations upon a wheel to minimize both axial and radial run-out. The assembled wheel, including the rim and attached wheel center is placed in the machine and the rim and particularly the bead seat portion is deformed both radially and axially into a true condition. While held in this condition, the center hole, the bolt hole chamfers, and the axial locating surfaces are finish machined.

12 Claims, 2 Drawing Figures

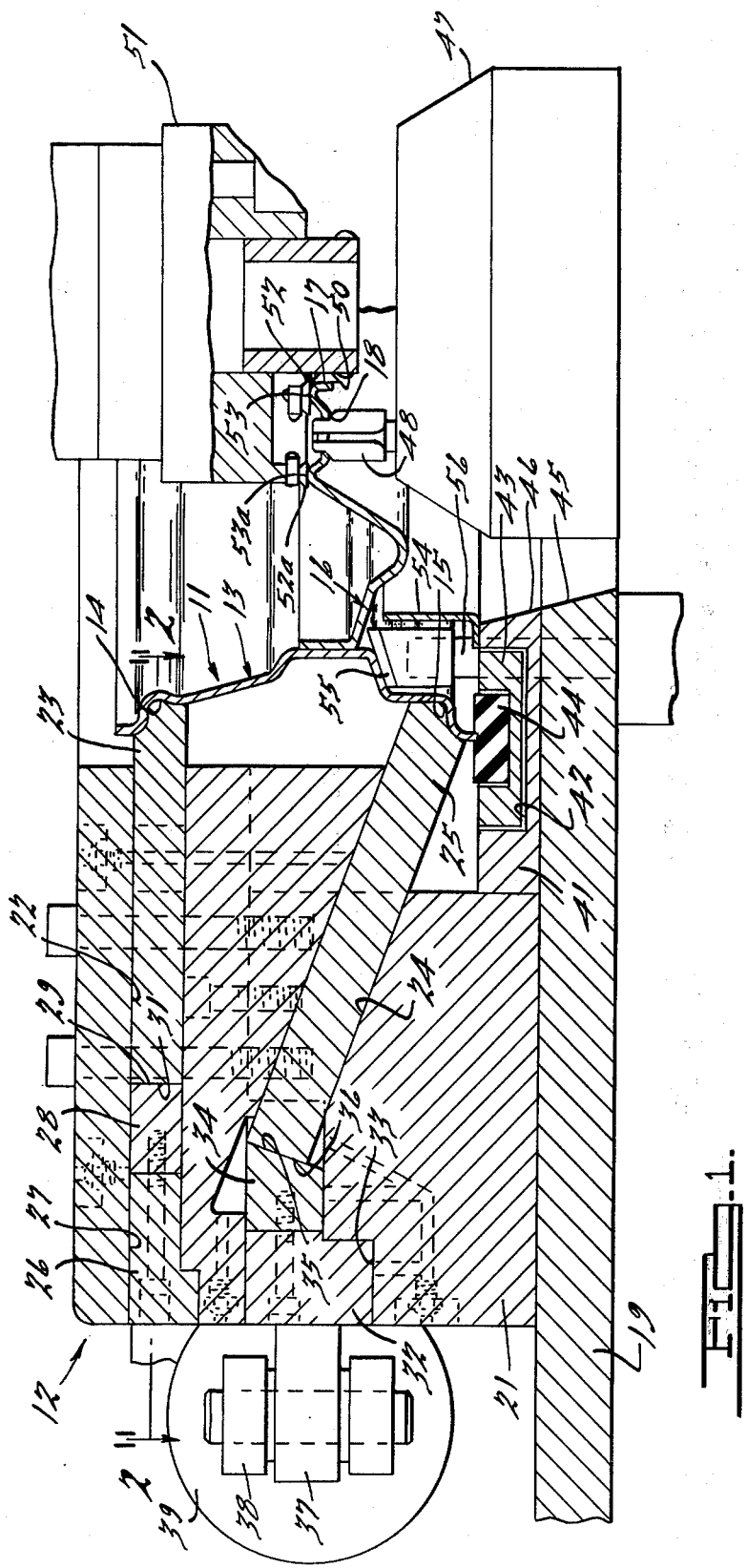

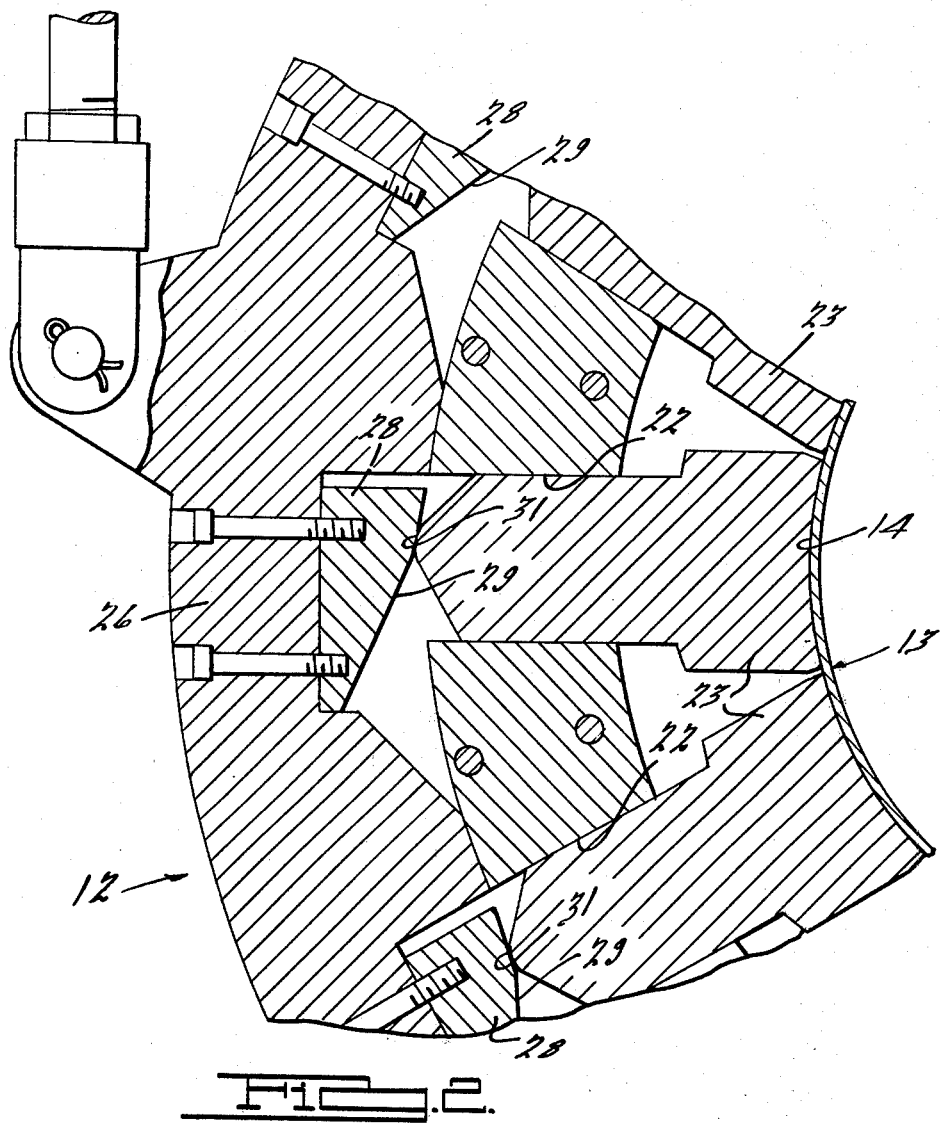

WHEEL FORMING MACHINE

BACKGROUND OF THE INVENTION

This invention relates to a method and machine for accurately forming assembled wheels and particularly to a method and machine in which both axial and radial run-out are minimized.

In U.S. Pat. Nos. 3,530,717, entitled "Wheel Rounding Machine", issued Sept. 29, 1970 in the name of Horace D. Gregg; 3,580,043, entitled "Wheel Rounding Machine", issued May 25, 1971 in the name of George E. Gollwitzer; and 3,581,550, entitled "Wheel Rounding Machine" issued June 1, 1971 in the name of Daniel E. Waterbury, and all assigned to the assignee of this invention, there are disclosed methods and apparatus for accurately forming assembled wheels. For the most part, these machines and methods are primarily directed toward minimizing radial run-out. Although such methods and machines result in the formation of extremely accurate wheel configurations, it is advantageous to provide even greater control over axial run-out and minimize not only the eccentricity between the bolt hole chamfers and the center hole but the circumferential spacing inaccuracies of the chamfers as well.

It is, therefore, a principal object of this invention to provide an improved method and apparatus for forming wheels.

It is another object of the invention to provide a method and apparatus for forming assembled wheels to minimize both axial and radial run-out.

SUMMARY OF THE INVENTION

This invention is adapted to be embodied in a method of accurately forming assembled wheels having a rim defining the tire engaging bead seat and a wheel center. The method comprises the steps of assembling the rim to the wheel center and deflecting the bead seat of the assembled wheel into an accurate axial location relative to the wheel center.

The invention is also adapted to be embodied in an apparatus for accurately forming assembled wheels as aforedescribed. The apparatus includes a plurality of forming dies and a wheel support. The wheel support supports the wheel while the forming dies effect both radial and axial deformation of the bead seat in relation to the wheel center.

BRIEF DESCRIPTION OF THE DRAWINGS

FIG. 1 is a vertical cross-sectional view taken through the center of a wheel forming machine embodying this invention and adapted to perform the method of the invention.

FIG. 2 is a cross-sectional view taken along the line 2—2 of FIG. 1.

DETAILED DESCRIPTION OF THE PREFERRED EMBODIMENTS

A machine for accurately forming vehicle wheels, indicated generally by the reference numeral 11, is illustrated partially and is identified generally by the reference numeral 12. The machine 12 is adapted to be employed in a wheel forming press, which has not been shown in full detail. The portions of the press which are conventional in construction have not been illustrated for the sake of simplicity and clarity.

The wheel 11 is comprised of a rim 13 having bead seat portions 14 and 15, that are adapted to receive a tire. A wheel center 16 is affixed to the rim 13 in a known manner. The wheel center 16 has a center opening 17 and a plurality of openings 18 spaced around the center hole 17 on a bolt circle. The holes 18 are chamfered to cooperate with conical nuts or the like which are used to attach the wheel 11 to the associated vehicle.

The machine 12 has a base plate 19 that is adapted to be affixed in a known manner to the bed of the associated press (not shown). Affixed to the base plate 19 is a ring assembly 21. The ring assembly 21 is formed with a plurality of horizontally disposed guides 22 in which radially movable forming tools or dies 23 are slidably supported. Beneath the guides 22, there are formed in the ring 21 a plurality of angularly disposed guides 24 in which forming tools or dies 25 are slidably supported.

A drive ring 26 is rotatably supported in a circumferential groove 27 formed in the ring assembly 21 at the base of the guides 22. Affixed to the drive ring 26 are a plurality of cams 28, there being one such cam 28 for each of the tools 23. The cams 28 have inclined cam surfaces 29 that coact with follower surfaces 31 formed on the tools 23. As will become apparent, rotation of the drive ring 26 effects reciprocation of the tools 23. The drive ring 26 is oscillated by a pneumatic cylinder assembly (not shown).

Positioned beneath the drive ring 26 is a second drive ring 32. The drive ring 32 is supported in a cylindrical groove 33 formed in the ring 21 at the base of the guides 24. Affixed to the ring 32 are a plurality of cams 34, there being one such cam for each of the tools 25. The cams 34 have inclined cam surfaces 35 that engage follower surfaces 36 on the tools 25. The drive ring 32 has an outstanding lever arm 37 that is connected by a trunnion 38 to the piston rod of a hydraulic cylinder 39 for rotation of the drive ring 32. A similar construction is provided for rotating the drive ring 26, as heretofore noted. Oscillation of the drive ring 32 effects reciprocation of the tools 25.

Centrally disposed in the ring assembly 21 is a supporting ring 41 that is affixed in any suitable manner to the base plate 19. The supporting ring 41 has an arcuate recess 42 formed in its upper surface in which an annular member 43 is supported. The annular member 43 is supported in the groove 42 on bearings (not shown) so that it is free to float in a radial direction. A cushion ring 44 is supported in the floating annular member 43 for engaging the lower surface of the rim 13 adjacent the bead seat 15.

The base plate 19 and ring 41 are formed with respective tapered openings 45 and 46 through which a vertically movable drive head 47 extends. The drive head 47 supports a plurality of cutters 48, there being one such cutter for each of the holes 18 in the wheel center. In the illustrated embodiment the cutters 48 are rotatably driven by the drive head 47 in any suitable manner and are adapted to perform a final countersink operation on the holes 18 as will be described. It is to be understood, however, that it is within the purview of this invention to replace the cutters 48 with tools that provide a combined drilling and countersinking operation or tools which in any other manner perform a final machining operation to form the holes 18 accurately and to assist in accurate location of the assembled wheel 11 in the associated vehicle.

An upper drive head 51 is supported for vertical movement by the ram of the press in any known manner and is rotatably driven about a vertical axis. The upper drive head 51 supports a plurality of cutters 52 and 52a that are adapted to provide a finishing operation on surfaces 53 and 53a of the wheel center 16 surrounding the center hole 17 and positioned on opposite sides of the holes 18. The surfaces 53 and 53a are finish machined so as to insure complete arrangement and to minimize bending loads on the wheel center 16 when it is assembled to the associated vehicle. The upper drive head 51 also includes a cutter 50 or other suitable cutting tool to finish the center hole surface 17.

A chip shield 54 is affixed to the ring 41 and extends upwardly from the tapered opening 46 toward the wheel center 16. The chip shield 54 will divert any chips generated by the cutting tools 48, 50, 52 and 52a down through the opening defined by the tapered surfaces 45 and 46.

A plurality of hardened wear pads 55 are carried by a lift-out assembly, indicated generally by the reference numeral 56. The wear pads 55 engage the rim 13 adjacent its connection to the wheel center hole 17 and are employed to lift the wheel 11 from the machine 12 at the completion of the forming operations, as will become apparent.

OPERATION

In operation, the wheel 11 is assembled by affixing the wheel center 16 to the rim 13 in a known manner. At this time, the wheel center openings 17 and 18 will be rough formed and ready for final finishing operation. Also, the rim 13 is formed so that the bead seat portions 14 and 15 are slightly over-size radially from the desired finished dimensions and undersized in axial dimension.

The thus assembled wheel 11 is then placed into the press and particularly into the machine 12 with the rim 13 being supported upon the cushion ring 44. At this time, the drive rings 26 and 32 will be rotated to a retractable position so that suitable return springs (not shown) can retract the forming tools 23 and 25. The drive rings 26 and 32 are then rotated so that the respective cams 28 and 34 will urge the forming tools 23 and 25 radially inwardly. At the same time, the tools 25 will be moved in an axial direction due to the incline of the guides 24. The tools 23 and 25 will then engage the wheel bead seats 14 and 15 and effect both a radial compression and an axial deflection of the bead seats to insure true concentricity and axial dimensioning. The degree of such deflection and/or deformation will, of course, depend on the initial accuracy of the bead seats 14 and 15.

While the tools 23 and 25 are held in their forming position, the drive head 47 is raised so that the cutting tools 48 will perform the final machining operation on the wheel center holes 18. Thus, these locating holes will be accurately machined about a true center as effected by the operation of the forming tools 23 and 25. If desired, the tools 48 may, in addition to providing a counter-sink operation, also provide an initial drilling operation to finish the holes 18.

At the same time the lower driving head 47 is raised so that the cutting tools 48 perform their forming operation on the holes 18, the upper drive head 51 is lowered and rotated so that the cutting tools 50, 52 and 52a will machine the wheel center surfaces 17, 53 and 53a. The coaction of the two drive heads 47 and 51 performs a back-up and axial locating function while the wheel 11 is axially located by the forming tools 23 and 25. Therefore, it should be readily apparent that the radial location of the holes 18 is accurately controlled as is the axial location of the surfaces 53 and 53a relative to the bead seats 14 and 15.

Once the machining operations are completed, the tools 23 and 25 are retracted by opposite rotation of the drive rings 26 and 32 and the retraction provided for by the return springs as aforedescribed. The drive heads 47 and 51 are also retracted and the finished wheel is lifted from the machine by raising the wear pads 55 through lifting of the lift-out assembly 56. The finished wheel 11 can then be removed from the machine 12.

It should be noted that the accurate machining of the wheel center surfaces 53 and 53a provides a degree of axial control over the finished shape of the wheel center 16 that will eliminate the necessity of providing tolerances in this surface as was previously the case. Thus, the vehicle manufacturer is permitted greater accuracy and the exact axial location of the wheel 11 on the vehicle is insured. Furthermore, bending loads exerted on the wheel center 16 when mounted due to irregularities are eliminated.

It is to be understood that the foregoing description is that of a preferred embodiment of the invention. Various changes and modifications may be made without departing from the spirit and scope of the invention as defined by the appended claims.

I claim:

1. The method of accurately forming an assembled wheel having a rim defining a tire engaging bead seat and a wheel center comprising the steps of assembling the rim to the wheel center and deflecting the bead seat of the assembled wheel into an accurate axial location relative to the wheel center.

2. The method as set forth in claim 1 further including the step of deflecting the bead seat of the assembled wheel into an accurate radial location simultaneously with the deformation of the bead seat into the accurate axial location.

3. The method as set forth in claim 1 further including the step of machining at least one locating hole in the wheel center when the bead seat is held in its deflected condition for accurately locating said hole relative to said bead seat.

4. The method as set forth in claim 3 further including the step of deflecting the bead seat of the assembled wheel into an accurate radial location simultaneously with the deformation of the bead seat into the accurate axial location.

5. The method as set forth in claim 1 further including the step of machining a radially extending surface of the wheel center simultaneously with the deflection of the bead seat for forming an axial locating surface on the wheel center in accurate axial relationship to the bead seat.

6. The method as set forth in claim 5 further including the step of deflecting the bead seat of the assembled wheel into an accurate radial location simultaneously with the deformation of the bead seat into the accurate axial location.

7. The method as set forth in claim 5 further including the step of machining at least one locating hole in the wheel center when the bead seat is held in its deflected condition for accurately locating said hole relative to said bead seat.

8. The method as set forth in claim 7 further including the step of deflecting the bead seat of the assembled wheel into an accurate radial location simultaneously with the deformation of the bead seat into the accurate axial location.

9. A machine for accurately forming an assembled wheel having a rim defining a pair of spaced tire engaging bead seats and an assembled wheel center, said machine comprising a first plurality of forming tools juxtaposed to one of said bead seats, means for reciprocating said first forming tools from a retracted position into an operative position for engaging said first bead seat and radially deflecting said first bead seat, a second set of forming tools juxtaposed to said second bead seat, said second set of forming tools being supported for movement in a radial direction and in an axial direction relative to the wheel, and means for moving said second set of forming tools from a retracted position to a forming position in which said second bead seat is deflected both radially and axially into trued condition.

10. A machine as set forth in claim 9 further including forming tool means adapted to perform a forming operation upon the wheel center while the forming tools are in their forming position.

11. A machine as set forth in claim 10 wherein the forming tool means comprises a plurality of cutters adapted to counter-sink locating bolt holes formed in the wheel center.

12. A machine as set forth in claim 10 wherein the forming tool means comprises cutter means for forming an axial locating surface on the wheel center when the forming tool means are in their forming position.

* * * * *